US008755562B2

United States Patent
Ishigami et al.

(10) Patent No.: US 8,755,562 B2
(45) Date of Patent: Jun. 17, 2014

(54) ESTIMATION APPARATUS, CONTROL METHOD THEREOF, AND PROGRAM

(75) Inventors: Miho Ishigami, Tokyo (JP); Masakazu Matsugu, Yokohama (JP); Katsuhiko Mori, Kawasaki (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 12/956,037

(22) Filed: Nov. 30, 2010

(65) Prior Publication Data

US 2011/0150286 A1    Jun. 23, 2011

(30) Foreign Application Priority Data

Dec. 22, 2009    (JP) ................................ 2009-291401

(51) Int. Cl.
*G06K 9/00*    (2006.01)

(52) U.S. Cl.
USPC ............................ 382/103; 382/100; 382/106

(58) Field of Classification Search
None
See application file for complete search history.

(56) References Cited

U.S. PATENT DOCUMENTS

| 6,173,066 B1* | 1/2001 | Peurach et al. | 382/103 |
| 6,363,173 B1* | 3/2002 | Stentz et al. | 382/195 |
| 2005/0225479 A1* | 10/2005 | Shirai | 342/70 |
| 2007/0237363 A1* | 10/2007 | Hagio et al. | 382/106 |
| 2010/0220338 A1 | 9/2010 | Ota et al. | |
| 2010/0322477 A1* | 12/2010 | Schmitt et al. | 382/103 |

FOREIGN PATENT DOCUMENTS

| IL | WO 2007/132451 | * 11/2007 | ............... H04Q 5/22 |
| JP | 2008-217544 A | 9/2008 | |

OTHER PUBLICATIONS

David G. Lowe, "Fitting Parameterized Three-Dimensional Models to Images", IEEE Transactions on Pattern Analysis and Machine Intelligence, May 1991, pp. 441-450, vol. 13, No. 5.

\* cited by examiner

*Primary Examiner* — Avinash J Yentrapati
(74) *Attorney, Agent, or Firm* — Fitzpatrick, Cella, Harper & Scinto

(57) ABSTRACT

An apparatus includes a capturing unit that captures a target object and generates a range image representing distance information, a general estimation unit that analyzes the range image and estimates a general position and orientation of the target object, and a determination unit that determines a priority order of a plurality of identification units, based on the estimated general position and orientation. In addition, a setting unit sets a search window indicating a range for detailed estimation of position and orientation of the range image based on a preregistered general size of the target object, a calculation unit calculates a difference between a first distance value of a first pixel in the range image and a second distance value of a second pixel which is next to the first pixel in the range image, and an updating unit updates the search window based on the calculated difference. A detailed estimation unit estimates a detailed position and orientation of the target object, using the plurality of identification units in the determined priority order within the range of the search window.

8 Claims, 12 Drawing Sheets

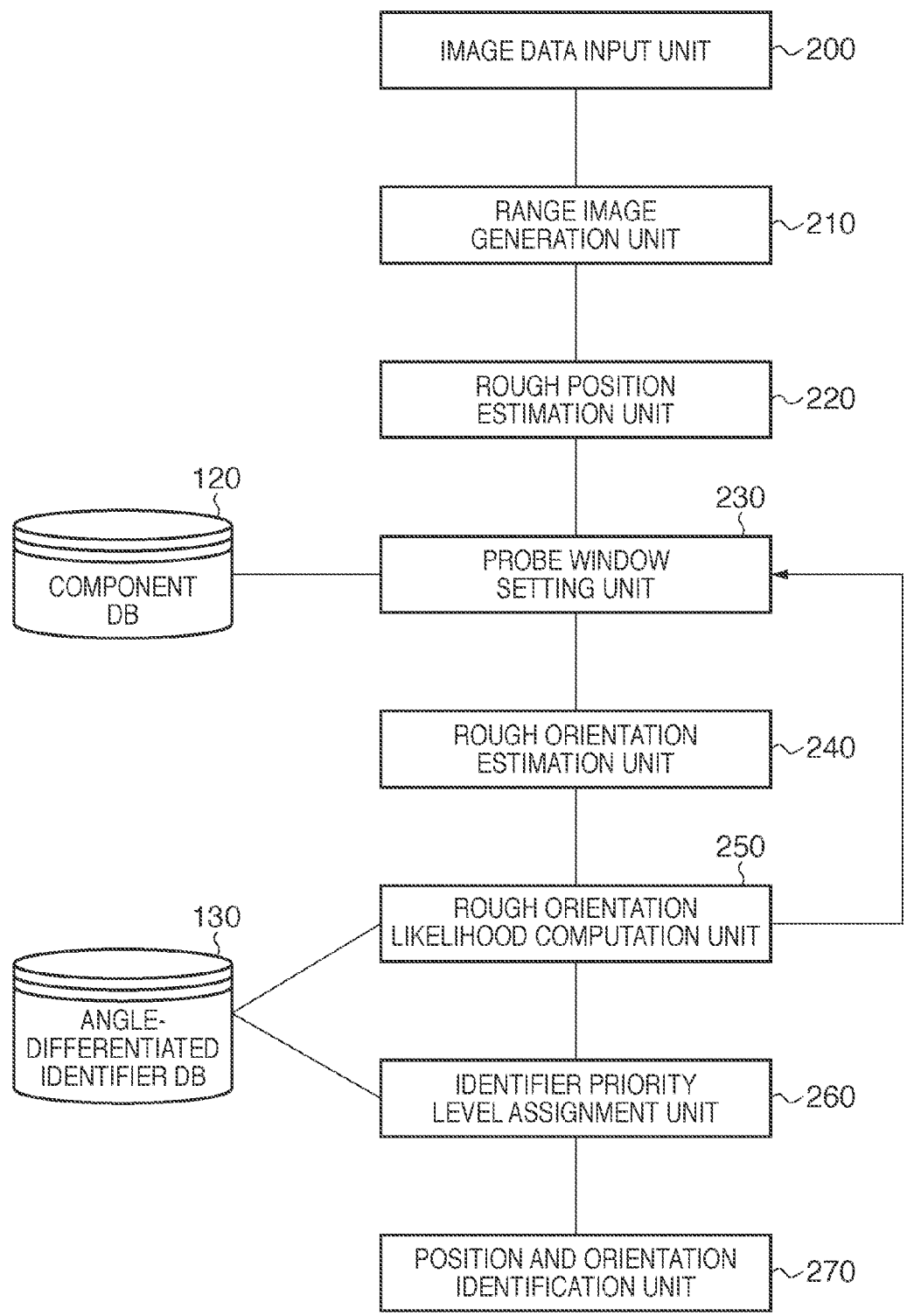

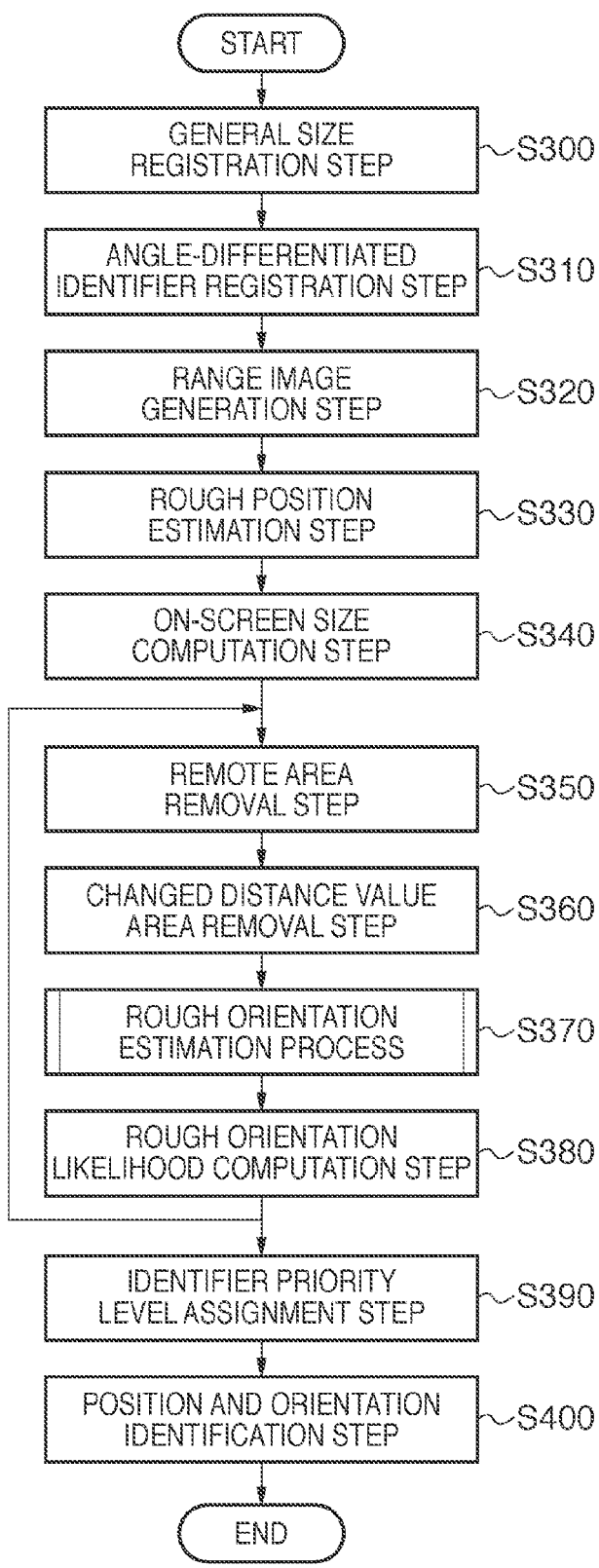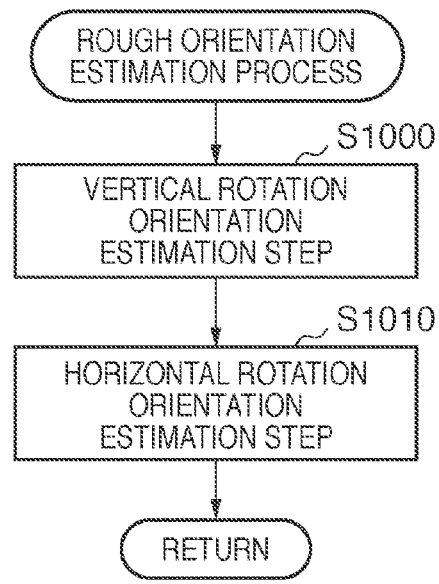

VERTICAL ROTATION DIRECTION

| | 0° | 30° | 60° | ............ | 150° |
|---|---|---|---|---|---|
| 0° | IDENTIFIER 1 | IDENTIFIER 2 | IDENTIFIER 3 | | IDENTIFIER 6 |
| 30° | IDENTIFIER 7 | IDENTIFIER 8 | IDENTIFIER 9 | | IDENTIFIER 12 |
| 60° | IDENTIFIER 13 | IDENTIFIER 14 | IDENTIFIER 15 | | IDENTIFIER 18 |
| ⋮ | | | | | |
| 330° | IDENTIFIER 67 | IDENTIFIER 68 | IDENTIFIER 69 | | IDENTIFIER 72 |

HORIZONTAL ROTATION DIRECTION

FIG. 11A

VERTICAL ROTATION DIRECTION

| | 0° | 30° | 60° | ............ | 150° |
|---|---|---|---|---|---|
| 0° | ✻6 | ✻2 | ✻9 | | IDENTIFIER 6 |
| 30° | ✻4 | ✻1 | ✻5 | | IDENTIFIER 12 |
| 60° | ✻7 | ✻3 | ✻8 | | IDENTIFIER 18 |
| ⋮ | | | | | |
| 330° | IDENTIFIER 67 | IDENTIFIER 68 | IDENTIFIER 69 | | IDENTIFIER 72 |

HORIZONTAL ROTATION DIRECTION

FIG. 11B

VERTICAL ROTATION DIRECTION

| | 0° | 30° | 60° | ............ | 150° |
|---|---|---|---|---|---|
| 0° | ✻6 | ✻2 | ✻9 | | IDENTIFIER 6 |
| 30° | ✻4 | ✻1 | ✻5 | | IDENTIFIER 12 |
| 60° | ✻7 | ✻3 | ✻8 | | IDENTIFIER 18 |
| ⋮ | | | | | |
| 330° | IDENTIFIER 67 | IDENTIFIER 68 | IDENTIFIER 69 | | IDENTIFIER 72 |

HORIZONTAL ROTATION DIRECTION

ESTIMATION APPARATUS, CONTROL METHOD THEREOF, AND PROGRAM

BACKGROUND OF THE INVENTION

1. Field of the Invention

The present invention relates to an estimation apparatus for estimating the position and orientation of objects, a control method thereof and a program, and more particularly to a technique for estimating with high accuracy and speed the position and orientation of objects capable of taking arbitrary positions and orientations in three-dimensional space, such as objects in a pile.

2. Description of the Related Art

Lining up components using a parts feeder is known as a method for a robot to hold components. However, with this method a dedicated parts feeder is needed for each individual component, and the parts feeders need to be reconfigured whenever there is a change in the type of component. In order to overcome this problem, a method has been proposed that involves detecting arbitrarily oriented components by estimating the position and orientation of an arbitrary component.

Japanese Patent Laid-Open No. 2008-217544 discloses a configuration for performing pattern matching by extracting, from distance data to an arbitrary component, an area approximating a plane forming the component, projecting the distance data onto the plane to create a range image, and comparing the range image with preregistered reference range images. This configuration enables recognition of the position and orientation of a component to be performed at high speed and with little computation, by using an area approximating a plane of the target object to create a range image based on the plane.

Generally, in the case of performing position and orientation recognition of one of the components that are piled up, there is a problem in that matching an image takes more time when pattern matching is performed using a plurality of identifiers provided at different angles.

With the configuration of Japanese Patent Laid-Open No. 2008-217544, this problem can be overcome by reducing the computational cost through using an image approximating the range image with a plane, as the image to be used when performing pattern matching. However, while the computation cost per pattern matching operation can be reduced according to this configuration, the number of pattern matching operations cannot be reduced since all of the identifiers provided for the different angles must be used in sequence. Also, since an approximate image is used, the pattern matching accuracy drops, possibly preventing a detailed estimation of position and orientation.

SUMMARY OF THE INVENTION

The present invention has been made in consideration of the above problems, and aims to provide a technique for estimating with high accuracy and speed the position and orientation of objects capable of taking arbitrary positions and orientations in three-dimensional space, such as objects in a pile.

According to one aspect of the present invention, an estimation apparatus for estimating a position and orientation of an object, includes: a capturing unit adapted to capture an object targeted for position and orientation estimation, and generate a range image representing distance information from the capturing unit to the target object; a general estimation unit adapted to analyze the range image and estimate a general position and orientation of the target object; a plurality of identification units each adapted to estimate a detailed position and orientation of an object within a predetermined position and orientation range; a determination unit adapted to determine a priority order of the plurality of identification units, based on the general position and orientation estimated by the general estimation unit; and a detailed estimation unit adapted to estimate a detailed position and orientation of the target object, using the plurality of identification units in the priority order determined by the determination unit.

According to another aspect of the present invention, a control method of an estimation apparatus for estimating a position and orientation of an object and provided with a plurality of identification units each adapted to estimate a detailed position and orientation of an object within a predetermined position and orientation range, includes: a capturing step of a capturing unit capturing an object targeted for position and orientation estimation, and generating a range image representing distance information from the capturing unit to the target object; a general estimation step of a general estimation unit analyzing the range image and estimating a general position and orientation of the target object; a determination step of a determination unit determining a priority order of the plurality of identification units, based on the general position and orientation estimated in the general estimation step; and a detailed estimation step of a detailed estimation unit estimating a detailed position and orientation of the target object, using the plurality of identification units in the priority order determined in the determination step.

Further features of the present invention will become apparent from the following description of exemplary embodiments (with references to the attached drawings).

BRIEF DESCRIPTION OF THE DRAWINGS

FIG. 2 is a functional block diagram of an estimation apparatus.

FIGS. 3A and 3B are flowcharts showing a flow of processing for estimating the position and orientation of a target component.

FIGS. 11A and 11B show example tables listing angle-differentiated identifiers with an assigned priority order.

DESCRIPTION OF THE EMBODIMENTS

Hereinafter, embodiments of the present invention will be described in detail with references to the accompanying drawings.

Overview of Position and Orientation Estimation

Figure 1:
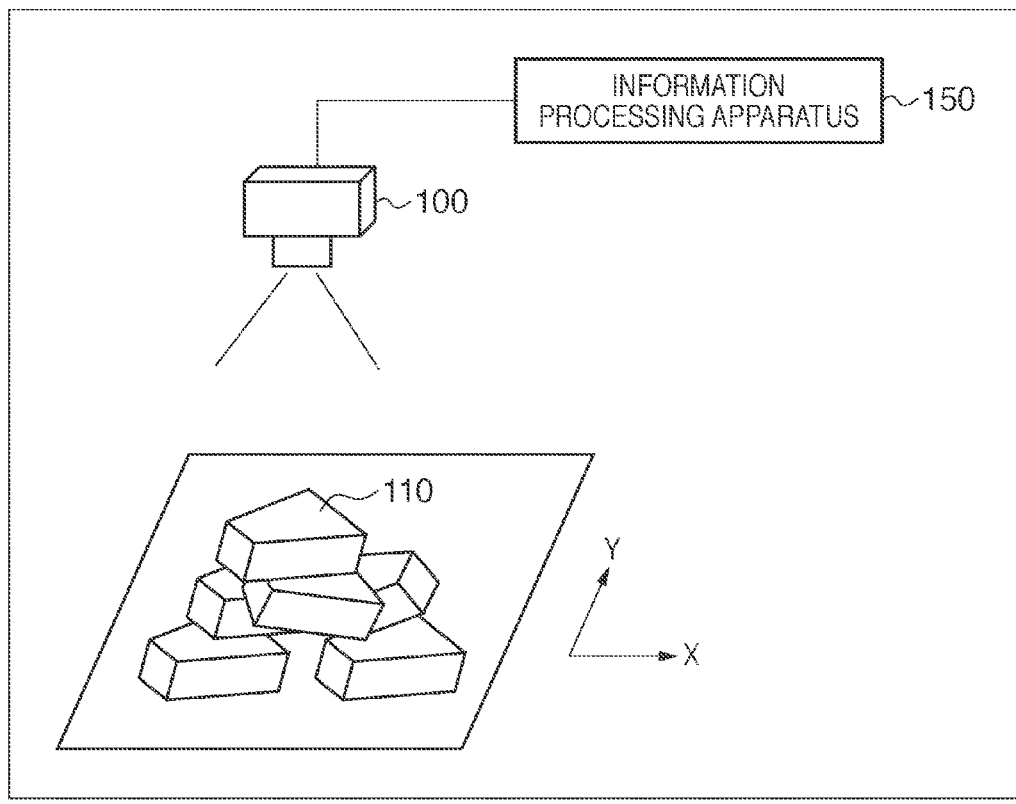
FIG. 1 shows an overall image of an image capture by an estimation apparatus.

FIG. 1 shows an overall image of an image capture by a piled component position and orientation estimation apparatus (hereinafter, estimation apparatus) according to the present embodiment. An image capturing apparatus 100 is an apparatus such as a camera that captures a pile of components 110 targeted for position and orientation estimation. In the present embodiment, components in the pile targeted for recognition are all identical components and are stacked randomly. When position and orientation estimation is performed, an information processing apparatus 150 provided in the estimation apparatus recognizes the position and orientation of an arbitrary component in the pile using image information input from the image capturing apparatus 100. The result of estimating the position and orientation of an arbitrary component can, for example, be used in a holding operation of a robot that picks up components. The estimation apparatus estimates the position and orientation of objects in an environment such as shown in FIG. 1.

Hardware Configuration of Information Processing Apparatus

Figure 16:
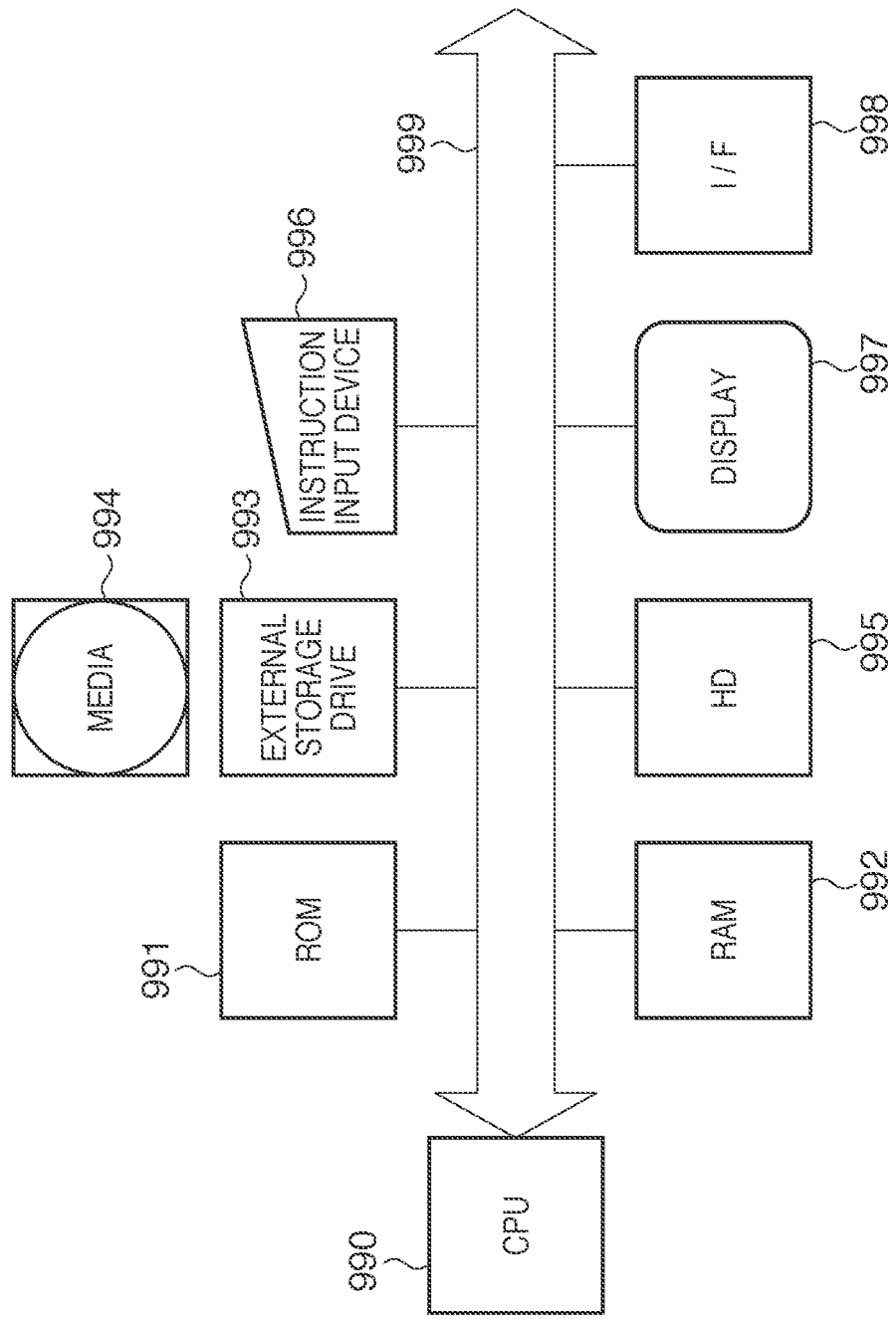
FIG. 16 is a hardware configuration diagram of an information processing apparatus.

FIG. 16 is a block diagram schematically showing an example of hardware configuration for the information processing apparatus 150 constituting the estimation apparatus according to the present embodiment. The information processing apparatus 150 according to the present embodiment is realized, for example, by a personal computer (PC), a workstation (WS) or a personal digital assistant (PDA).

In FIG. 16, reference numeral 990 denotes a CPU. The CPU 990 executes application programs, an operating system (OS), control programs and the like stored in a hard disk device 995 (discussed later), and performs control by temporarily storing information, files and the like required for program execution in a RAM 992.

Reference numeral 991 denotes a ROM that internally stores programs such as basic I/O programs and various types of data to be used in basic processing. Reference numeral 992 denotes a RAM that temporarily stores various types of data and functions as a main memory, a work area and the like of the CPU 990.

Reference numeral 993 denotes an external storage drive for realizing access to recording media, and is able to load programs and the like stored on media (recording media) 994 onto the computer system. Note that the media 994 includes flexible disk (FD), CD-ROM, DVD, USB memory, MO and flash memory.

Reference numeral 995 denotes an external storage device, with a hard disk device (hereinafter, HD) that functions as a mass storage memory being used in the present embodiment. The HD 995 stores application programs, an OS, control programs, associated programs, and the like.

Reference numeral 996 denotes an instruction input device that is equivalent to a keyboard, a pointing device (mouse, etc.), a touch panel or the like. Using the instruction input device 996, a user inputs commands and the like for controlling the information processing apparatus 150 according to the present embodiment of the apparatus. Reference numeral 997 denotes a display that displays command input from the instruction input device 996, responses to these commands from the information processing apparatus 150, and the like.

Reference numeral 999 denotes a system bus that handles the flow of data within the information processing apparatus 150. Reference numeral 998 denotes an interface (hereinafter, I/F), and data exchange with external devices is performed via this I/F 998.

Note that a configuration in which the above hardware devices are replaced by software that realizes equivalent functions to the devices can also be adopted. Operations that will be discussed later are realized by the CPU 990 executing programs stored in a computer-readable storage medium such as the ROM 991.

Functional Configuration of Estimation Apparatus

FIG. 2 shows the functional configuration of the estimation apparatus according to the present embodiment, and the functions shown in FIG. 2 can be realized entirely by the information processing apparatus 150. An overview of the constituent elements shown in FIG. 2 will now be described.

An image data input unit 200 is a constituent element that imports images from the image capturing apparatus 100, which is a camera or the like. As mentioned above, the image capturing apparatus 100 captures a component (target object) targeted for position and orientation estimation. A range image generation unit 210 is a constituent element that generates, for a component shown in the image imported from the image data input unit 200, a range image representing distance information from the image capturing apparatus 100 to the component. A rough position estimation unit 220 is a constituent element that estimates a position of the target component whose position and orientation are to be estimated in three-dimensional space, based on a certain representative point. A general position estimation process that involves estimating the general position of the target object from the distance information represented by the range image is performed by the rough position estimation unit 220.

A probe window setting unit 230 is a constituent element that sets a detection frame (window) required for estimating the rough size of the component and performing the position and orientation estimation process. A rough orientation estimation unit 240 is a constituent element that estimates the broad orientation taken by a target component whose position and orientation are to be estimated in three-dimensional space. As will be discussed later, in the present embodiment, general orientation estimation that involves estimating the general orientation of a target object using the positional relationship of two points on the target object shown by the range image and an average value of normal vectors on the surface of the target object is performed by the rough orientation estimation unit 240. The process of thus analyzing a range image and estimating the general position and orientation of the target object by the rough position estimation unit 220, the rough orientation estimation unit 240 and the like, will be called general position and orientation estimation.

A rough orientation likelihood computation unit 250 is a constituent element that computes a likelihood (degree of reliability) of the orientation estimation result obtained from the rough orientation estimation unit 240. A priority level identifier assignment unit 260 is a constituent element that determines/assigns priority levels (priority order) for a plurality of identifiers, based on the general position and orientation estimated for the target component. In the present embodiment, a priority level is assigned to each identifier, based on likelihood information obtained from the rough orientation likelihood computation unit 250. An identifier is a constituent element that estimates the detailed position and orientation of an object within a predetermined position and orientation range, and is realized in the present embodiment by the CPU 990 executing prescribed processing based on a program. A position and orientation identification unit 270 is a constituent element that identifies the position and orientation of a component using identifiers by the priority order obtained from the identifier priority level assignment unit 260. That is, the position and orientation identification unit 270 performs a detailed estimation process that involves estimating the detailed position and orientation of a target object using a plurality of identifiers, according to the priority order of the identifiers.

Also, the estimation apparatus is provided with a component database 120 and an angle-differentiated identifier database 130, as databases prestoring information required for position and orientation estimation of a component. These databases can be provided in the HD 995, for example. The component database 120 is a database storing information of three-dimensional approximate models of a component targeted for recognition. The information in the component database 120 is, for instance, used in the probe window setting unit 230 for estimating component size and in the rough orientation estimation unit 240 for estimating orientation. The angle-differentiated identifier database 130 is a database of identifiers provided at different angles having a certain interval therebetween. Angle-differentiated identifiers are able to perform detailed estimation of the position and orientation of a target component, in a given range of positions and orientations (angles, in the present embodiment). The angle-differentiated identifier database 130 is used when performing detailed position and orientation estimation using angle-differentiated identifiers by the priority order determined by the identifier priority level assignment unit 260. Note that while the identifiers of different angles are provided in the present embodiment, identifiers of different sizes or illumination variations may further be provided.

Overall Processing

Next, an overview of processing executed by the estimation apparatus according to the present embodiment will be described with reference to FIGS. 3A and 3B. FIGS. 3A and 3B are overall processing flowcharts representing the flow of the overall processing. The overall processing can, for example, be executed under the control of the CPU 990 of the information processing apparatus 150.

In FIG. 3A, the first two steps (S300, S310) are information preregistering steps in the databases. That is, in step S300 (general size registration step), general size information indicating the general size of the component is stored in the component database (model data database) 120 of FIG. 2. At step S310 (angle-differentiated identifier registration step), information on the angle-differentiated identifiers is stored in the angle-differentiated identifier database 130.

Subsequently, in step S320 (range image generation step), a range image describing distance information to the target object is generated, and in step S330 (rough position estimation step), the approximate spatial area in which the object exists in three-dimensional space is estimated. Further, in step S340 (on-screen size computation step), the on-screen size of the target component obtained from the image data input unit 200 is computed using the distance information to the object and the general size of the object. Next, in step S350 (remote area removal step), areas that are within the range of the area obtained in step S340 but distant from the camera and possibly outside the range in which the target object exists are removed. Next, in step S360 (changed distance value area removal step), areas that are judged to not be an area in which the component exists because of the distance value changing sharply in the range image are removed. The approximate position of the object and the size of the detection frame for position and orientation estimation are derived by the processing of the above steps.

Subsequently, in step S370 (rough orientation estimation step), the rough orientation of the component is estimated using the range image, and in step S380 (rough orientation likelihood computation step), the likelihood is computed using an identifier of corresponding orientation based on the position and orientation estimation result obtained in step S370. In step S390 (identifier priority level assignment step), a priority level is assigned to each identifier based on the likelihood information obtained in step S380. In step S400 (position and orientation identification step), the most probably position and orientation are identified using the identifiers by the priority order obtained in step S390.

Note that in step S380, the identification process is performed using an identifier whose angle is closest to the orientation estimation result obtained in step S370, and the likelihood thereof (reliability of the identifier) is computed. If the value of the likelihood does not exceed a given threshold, the processing returns to step S350, having determined that the orientation estimation of the identifier that was used is not accurate, and the size of the detection frame is changed and the processing is repeated until the likelihood exceeds the threshold. The method of changing the size of the detection frame will be discussed later with reference to FIG. 8.

General Size Registration/Angle-differentiated Identifier Registration

Hereinafter, the processing of the steps of the overall processing flowchart of FIG. 3A will be described in detail.

In step S300 (general size registration step), data relating to the size of the component is registered in the component database 120, and in step S310 the identifiers provided at different angles are registered in the angle-differentiated identifier database 130.

Figures 4, 5:
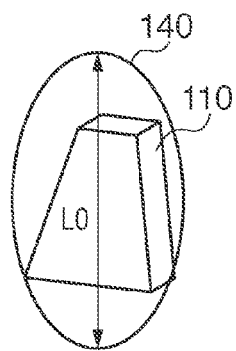
FIG. 4 shows an example three-dimensional shape including the target component.
FIG. 5 shows an example table listing angle-differentiated identifiers.

The general size related to the component targeted for position and orientation estimation is registered in step S300. One method of deriving the general size will be described using FIG. 4. FIG. 4 schematically shows an ellipsoid 140 including the target component 110 illustrated in FIG. 1. Here, a line segment L0 in the diagram indicates the general size of the target component 110. The general size L0 is a line segment joining two points on the ellipsoid 140 circumscribing the component. In step S340 (discussed later), the longest diagonal on the circumscribing ellipsoid 140 is denoted as L0, since L0 is used in estimating on-screen size.

Since the general size of the target object is thus indicated by the distance between two predetermined points on a prescribed three-dimensional shape including the target object, the calculation can be efficiently performed. Note that while an example in the case of using an ellipsoid as the prescribed three-dimensional shape is described in the present embodiment, any shape may be used such as a cube or a cone.

In step S310 (angle-differentiated identifier registration step), angle-differentiated identifiers are registered. Angle-differentiated identifiers are identifiers capable of performing detailed identification of the orientation of a component in a specific range, and are realized in the present embodiment by the CPU 990 executing prescribed processing based on a program. Accordingly, in step S310 a program for angle-differentiated identifiers, and parameter data and the like required for implementing the identifiers are registered. Because the on-screen size of the figure including the component 110 differs according to its orientation, window sizes provided for the different angles are preregistered in the angle-differentiated identifier database 130. Also, the angle-differentiated identifiers are not only provided for each type of component but are also provided in advance for each orientation that is visible when the component is rotated in three-dimensional space. Hereinafter, the direction of the ground where the component is placed in a horizontal plane will be called the "horizontal rotation direction" and the direction orthogonal to the horizontal rotation direction will be called the "vertical rotation direction." In other words, the rotation direction around the vertical axis will be called the horizontal rotation direction (second rotation direction), and the rotation direction around the horizontal axis will be called the vertical rotation direction (first rotation direction). Note that while the case where the target component is captured vertically downward from above, as in FIG. 1, is described in the present embodiment, the direction of capture is of course not limited thereto. For example, the configuration according to the present embodiment can also be similarly applied in the case where the target component is captured horizontally or vertically upward.

FIG. 5 shows a table listing angle-differentiated identifiers registered in 30 degree increments. The rotation angles for registering a component are 360 degrees in the horizontal rotation direction and 180 degrees in the vertical rotation direction. Registering identifiers every 30 degrees as shown in FIG. 5 results in the horizontal rotation direction being divided into 12 angles (i.e., 360 degrees/30 degrees) and the vertical rotation direction being divided into 6 angles (i.e., 180 degrees/30 degrees), giving (12×6=) 72 types of angle-differentiated identifiers provided for each component. Therefore, the total number of identifiers registered in the angle-differentiated identifier database 130 will be 12×6× total number of components.

Range Image Generation

In step S320 (range image generation step), a range image is created. A range image is an image created using distance information obtained by measuring the distance from the image capturing apparatus 100 to the capture target with a rangefinder. The rangefinder is realized, for example, by a laser, a stereo camera, or the like. In the present embodiment, distance information is mapped on a planar image, and a range image is generated by converting the mapped values to gray values. The range image generated here is used in the ensuing steps. That is, in step S330, the range image is used in estimating the area in which the object exists. Then, in steps S340, S350 and S360, the range image is used in cutting down the area in which the component exists on the screen. Further, in step S370, the range image is used when estimating the slope of the component during rough orientation estimation.

Rough Position Estimation/On-screen Size Computation

In step S330 (rough position estimation step), the position of a representative point is broadly estimated from the area occupied by the component in the input image. A representative point is a point indicating the general position of the target component. As for the area in which the component exists, rough position information on a component group can be acquired by taking a range image created when there is no recognition target as a background image, and deriving the difference between the background image and the range image created when the object targeted for position and orientation estimation is captured. Thereafter, a point can be arbitrarily selected from the range image, and this point can be set as the representative point. This representative point may be anywhere within the range in which the component exists, although in the case where a point within a component that has a concealed portion or a point of a component hidden behind other components is selected, orientation recognition accuracy deteriorates, and difficulties may be encountered in the component pick-up operation performed by a robot after position and orientation estimation. Thus, in the present embodiment, the point closest to the image capturing apparatus 100 is determined as the representative point. Detailed position and orientation estimation of a component that can be picked up most easily out of the group of components can thereby be performed.

In step S340 (on-screen size computation step), the on-screen size of the component captured in the input image is computed using the general size L0 of the component registered in the component database 120, and the distance information measured in step S320. The size of the component estimated here is used when deriving the size of the detection frame for identifying position and orientation using the angle-differentiated identifiers in step S400. Next, a probe window 810 is determined using the on-screen size of the component. The probe window 810 is an area set so as to include all of the areas in which the target component whose position and orientation to be estimated can possibly exist (spatial range that the target component can occupy), centered at the representative point derived in step S330. The identifiers in the present embodiment perform detailed estimation of the position and orientation of the target component based on the range image included in the probe window 810. Note that areas in which the component targeted for position and orientation estimation does not exist may also possibly be included in the probe window 810. As will be discussed later, areas in which the target component whose position and orientation are to be estimated cannot possibly exist are thus removed in steps S350 and S360 by cutting down the size W0 of the probe window. This is because in order to perform position and orientation estimation with high accuracy and efficiency, it is necessary as little distance information of components other than the target component as possible and the distance information to be represented in the probe window 810.

Figure 6A:
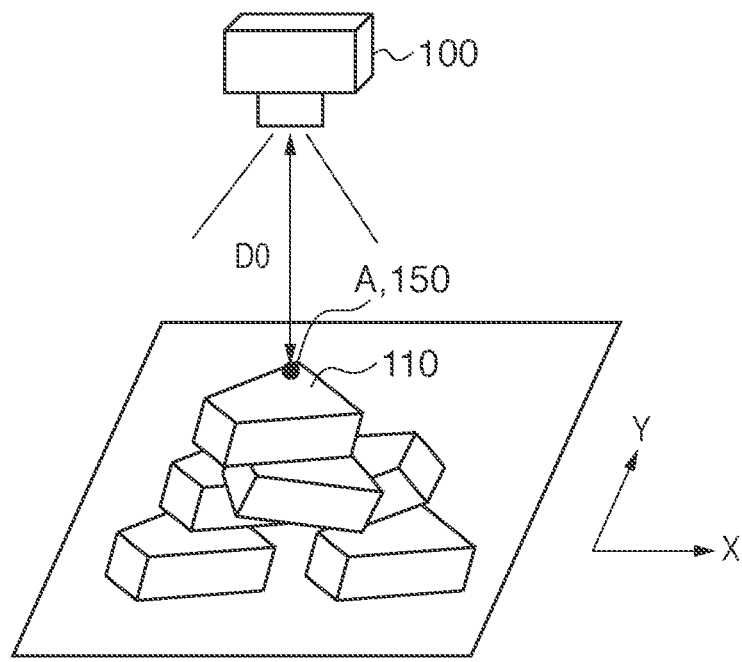
FIGS. 6A and 6B show computation of the general size of a target component in a range image.
Figure 6B:
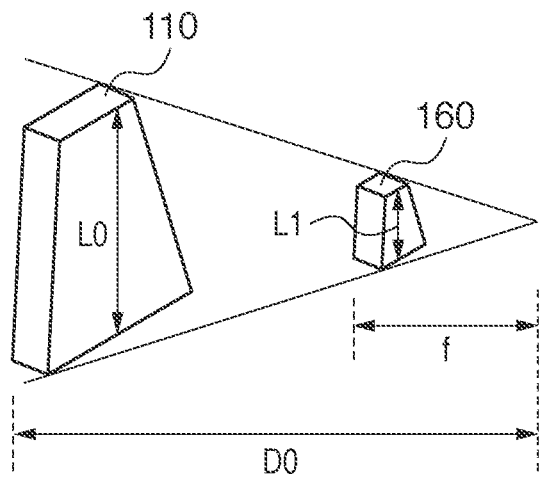

Next, steps S330 and S340 will be described in detail with reference to FIGS. 6A and 6B and FIG. 7. FIG. 6A displays the image capturing apparatus 100 and the component 110 of FIG. 1, the representative point A (150) derived in step S330, and a distance D0 between the point A (150) and the image capturing apparatus 100. In step S330, the closest point to the image capturing apparatus 100 is located from the space occupied by the pile of components, and taken as the representative point A (150). At this time, the shortest point in distance from the estimation apparatus is retrieved using the range image obtained from step S320. The representative point A (150), which is the shortest point in distance, is taken as the rough position estimation result.

In step S340, an on-screen size L1 of the component that is the distance D0 from the image capturing apparatus 100 is computed using the distance D0 and the general size L0 of the component registered in the component database 120. FIG. 6B illustrates a specific method of computing the on-screen size L1 of the component. FIG. 6B shows the component 110 and the distance D0 shown in FIG. 6A and the general size L0 of the component shown in FIG. 4, with the focal length of the image capturing apparatus 100 given as f, the on-screen component 110 denoted as reference numeral 160, and the on-screen general size of the component given as L1. The following relationship holds between f, D0, L1 and L0, $$f:L1=D0:L0 \qquad (1)$$

where f is the focal length of the image capturing apparatus 100. The on-screen size of the component will be $$L1=f \times L0/D0 \qquad (2)$$

using equation (1). Because L1 is in millimeters, converting L1 to L2 represented in pixels gives the following:

$$L2(\text{pixels}) = \text{resolution (dpi)} \times L1 \text{ (mm)} \quad (3)$$

Figure 7:
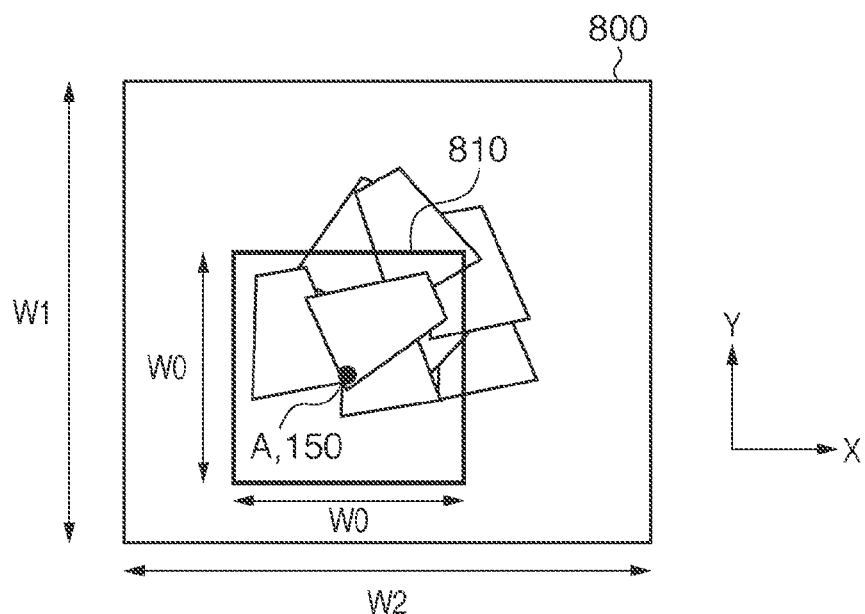
FIG. 7 shows the setting of a probe window in the range image.

The probe window 810 is determined as shown in FIG. 7, using the on-screen size L2 of the component obtained by equation (3).

FIG. 7 shows an example image input from the image capturing apparatus 100. FIG. 7 shows the representative point A (150) shown in FIG. 6A, with the size of the image input from the image capturing apparatus 100 given as W1×W2, and the size of the probe window given as W0×W0. The input image from the image capturing apparatus 100 whose size is defined as W1×W2 is denoted by reference numeral 800, and the square shape centered at the representative point A (150) whose size is defined as W0×W0 is the probe window 810. At this time, setting the probe window 810 to an area ±L2 in the X-axis direction and ±L2 in the Y-axis direction centered at the representative point A (150) enables the component 110 to be included in the probe window 810 whatever the position or orientation of the component is. Therefore, the size of the probe window 810 will be W0=2× L2 when the on-screen component size L2 is used.

Thus, in the present embodiment, the general size of the target component in the range image is computed based on the distance information represented by the range image and the preregistered general size of the target component. A probe window indicating the range for performing detailed estimation of position and orientation is then set on the range image, in accordance with the computed general size. The identifiers estimate the detailed position and orientation of the target component, within the range of this probe window. Thus, in the present embodiment, position and orientation estimation with high accuracy and efficiency is enabled, since the detailed position and orientation of the target component is estimated after having narrowed down the range.

Remote Area Removal/Changed Distance Value Area Removal

Figure 8:
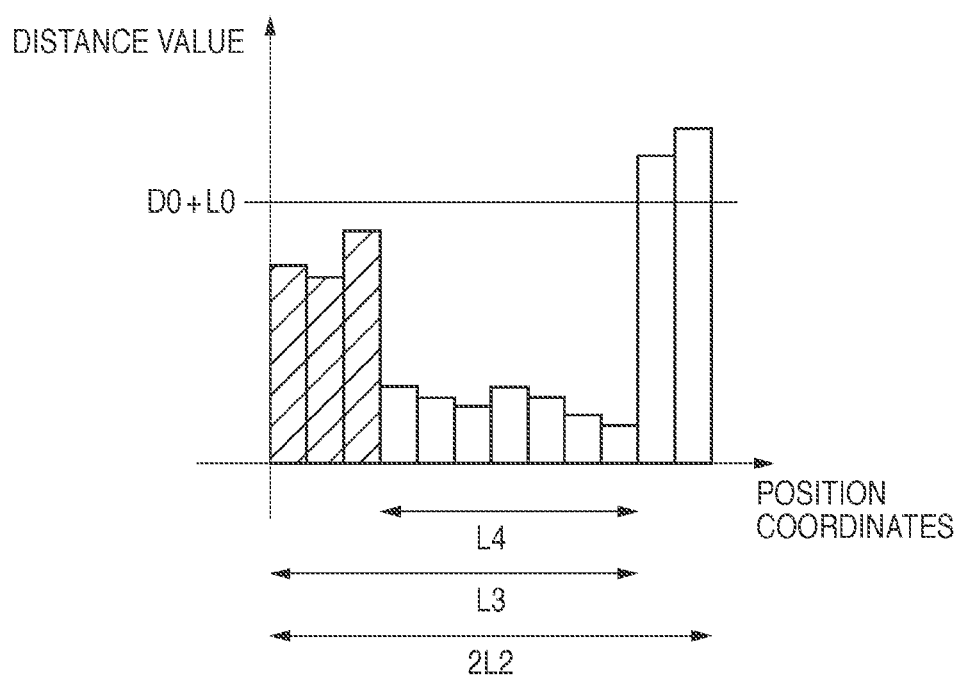
FIG. 8 schematically shows the change in distance value of the target component from the image capture camera.

Next, steps S350 (remote area removal step) and S360 (changed distance value area removal step) will be described in detail with reference to FIG. 8. FIG. 8 schematically shows the change in distance value of the target object from the image capturing camera, along a straight line passing through the probe window 810 in FIG. 7 parallel to the X-axis (or Y-axis). In the present embodiment, the size W0 of the probe window is cut down by determining and removing areas in which the component 110 in the probe window 810 derived in step S340 cannot possibly exist, from the change in distance value shown as in FIG. 8. FIG. 8 shows the distance D0 and the general size L0 of the component shown in FIG. 6B, and the on-screen size of the component is given as L2. Also, the size of the probe window 810 cut down in step S350 is given as L3, and the size of the probe window 810 cut down in step S360 is given as L4.

In step S350 (remote area removal step), the distance D0 to the arbitrary representative point A (150) is compared with other areas, and areas that are further away than the value of D0 are removed. Given that the distance value to the arbitrary representative point A (150) in the range image is D0, and the area in which the component targeted for position and orientation estimation in the present embodiment includes the arbitrary representative point A (150), the area in which the component exists can be cut down based on the distance value. In this example the general size of the component is known in advance to be L0, thus the size can be estimated whatever orientation the component targeted for position and orientation estimation is placed in. The size of a cube including the component will, from the general size L0, be L0×L0 in terms of the actual component and L1×L1 if the component is located a distance D0 away. Hence, areas having a distance value greater than or equal to D0+L0 lie outside the area in which the component exists because of exceeding the range of the cube including the component, despite being within the frame of the probe window 810 in the range image. Therefore, corresponding areas can be removed.

For example, in FIG. 8, the size of the probe window 810 will be L3 once the areas whose distance value is at or above D0+L0 have been removed. If, however, the component 110 targeted for position and orientation estimation has a depression, an area whose distance value is at or above D0+L0 will be judged to be a depression in the component when not at the edge of the image, and area removal is not performed. Cutting down the size W0 of the probe window is similarly performed for both the X-axis direction and the Y-axis direction. The size of the probe window after step S350 will thus be (L3 in the X-axis direction)×(L3 in the Y-axis direction).

Next, in step S360 (changed distance value area removal step), areas whose distance value changes sharply are removed. Specifically, a differential image is created using the range image, and areas that are not the same component are removed. Because an area whose amount of change is at or above a maximum amount of change is highly likely to not be the same component, where the maximum amount of change is given as L0/2 using the general size L0, that area is removed. In FIG. 8, an example is shown in which the shaded areas are areas in which the amount of change exceeds the threshold value. As evident from FIG. 8, the size of the probe window will be L4 once the areas whose change in distance value is at or above the threshold have been removed. Also, similarly to step S350, an area whose change in distance value is at or above the threshold is assumed to be a depression in the same component if other than the edge of the image, and area removal is not performed. Cutting down the size W0 of the probe window is performed similarly in relation to the X-axis direction and the Y-axis direction. The size of the probe window after step S360 will thus be (L4 in the X-axis direction)×(L4 in the Y-axis direction). The probe window 810 is given as W0×W0=(L4 in the X-axis direction)×(L4 in the Y-axis direction), using L4 ultimately derived in the above steps.

Thus, in the present embodiment, the probe window is updated by removing areas in the range image that indicate distances at which the target object cannot possibly exist and areas whose change in distance is greater than a predetermined value from the probe window. Thus, according to the present embodiment, position and orientation estimation with high accuracy and efficiency is realized by effectively narrowing down the range for performing detailed position and orientation estimation.

Rough Orientation Estimation

In step S370 (rough orientation estimation step), the rough orientation of the component is estimated using the range image obtained in step S320 and information registered in the component database 120. The processing of step S370 will be described in detail with reference to FIG. 3B.

FIG. 3B illustrates step S1000 (vertical rotation orientation estimation step) and step S1010 (horizontal rotation orientation estimation step), which are two steps relating to step S370. Because the component targeted for position and orientation estimation rotates in three-dimensional space, orientation estimation is performed separately for the vertical rotation direction (first rotation direction) and the horizontal rotation direction (second rotation direction). In step S1000, the slope of the component targeted for recognition in the vertical rotation direction is estimated. Hereinafter, the method of computing the slope will be described in detail with reference to FIGS. 9A and 9B.

Figure 9A:
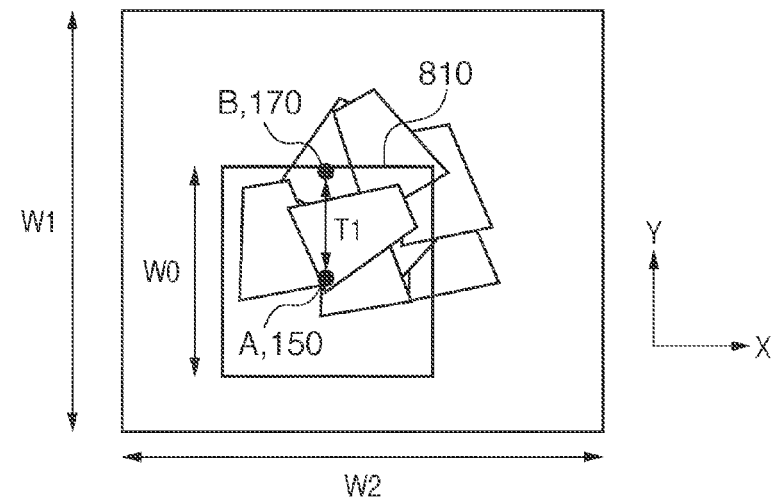
FIGS. 9A and 9B show an estimation of the general orientation of the target component relating to a vertical rotation direction.

In FIG. 9A, the representative point is A (150), the input image size is W1×W2, and the size of the probe window 810 is W0×W0, similarly to FIG. 7. Further, a point on a straight line that passes through the representative point A (150) parallel to the Y-axis (or X-axis) is given as a point B (170). In the present embodiment, the point B is within the range of the probe window 810, and is assumed to be at an edge point of the probe window 810 (see FIG. 9A). Note that the point B (170), while at an edge point of the probe window 810 in the present embodiment, may be anywhere in the range of the probe window 810.

Figure 9B:
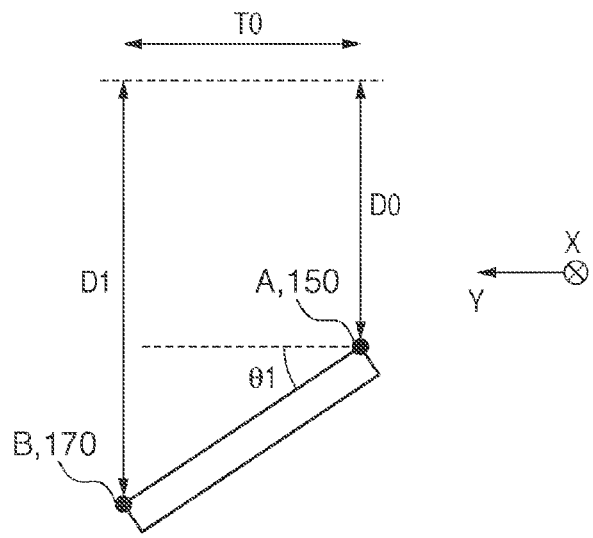

The method of estimating the orientation in the vertical rotation direction from the range image will be described using FIG. 9B. FIG. 9B schematically shows the target component from a direction orthogonal to the image capture direction (toward the X-axis positive direction from the X-axis negative direction), and shows the target component being captured downwardly from above on the page.

In FIG. 9B, the representative point shown in FIG. 6A is given as the point A (150), and the distance between the representative point and the image capturing apparatus is given as D0 (provided from the range image data). Further, the point shown in FIG. 9A is given as the point B (170), the distance from the image capturing apparatus 100 to the point B (170) is given as D1, and the on-screen distance from the representative point A (150) to the point B (170) in the input image is given as T1. The distance D1 is derived by measuring the distance from the image capturing apparatus 100 to the point B (170) using the same apparatus that measured the distance D0. Because the input image can be used to derive the on-screen height T1 of the component, the result thereof is used to compute an actual distance T0 from the point A to the point B from the focal length f, the distance D0 to the arbitrary point A, and the on-screen distance T1 from the point A to the point B, with a similar method to FIG. 6B.

Converting the on-screen distance T1 (pixels) to T2 (mm), gives:

$$T2 \text{ (mm)} = T1 \text{(pixels)} / \text{resolution (dpi)} \quad (4)$$

Further, the relationship between f, D0, T0 and T2 is represented as follows.

$$f : T2 = D0 : T0 \quad (5)$$

Here, the actual height from the point A to the point B will be T0=D0×T2/f, using equation (5). The slope θ1 of the component is then computed using D0, D1 and T0.

$$\tan \theta 1 = (D1 - D0) \times f / D0 \times T2 \quad (6)$$

The angle θ1 derived by equation (6) is taken as the slope of the component in the vertical rotation direction. Thus, in the present embodiment, the orientation of the target component relating to the vertical rotation direction is estimated from the positional relationship of two points (A, B) on the target component shown by the range image. The orientation relating to the vertical rotation direction can thus be efficiently estimated.

Figure 10:
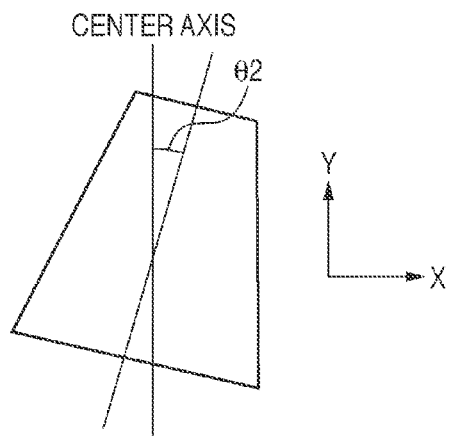
FIG. 10 shows an estimation of the general orientation of the target component relating to a horizontal rotation direction.

Next, the slope of the component targeted for recognition in the horizontal rotation direction is estimated in step S1010 using FIG. 10. FIG. 10 schematically shows the target component from the image capture direction. Vectors in the normal direction of the plane observed as the range image are firstly derived, and the average value of these vectors in the normal direction is derived. A slope θ2 of the average value of the vectors in the normal direction is taken as the slope of the component in the horizontal rotation direction. The orientation of the target object relating to the horizontal rotation direction (second rotation direction) orthogonal to the vertical rotation direction is estimated from the average value of normal vectors on the surface of the target object shown by the range image. The orientation relating to the horizontal rotation direction can thus be efficiently estimated. Consequently, θ1 derived in step S1000 and θ2 derived in step S1010 are taken as the rough orientation estimation result of step S350.

Rough Orientation Likelihood Computation

In step S380 (rough orientation likelihood computation step), the rough orientation estimation result obtained in step S370 is evaluated, and it is determined whether to proceed to the next processing. Here, an identifier whose orientation corresponds most closely to a slope in the vertical rotation direction of θ1 and a slope in the horizontal rotation direction of θ2 is located from the table in FIG. 11A listing the angle-differentiated identifiers. The likelihood is then computed using the probe window 810 and the identifier whose orientation is thought to be closest to the orientation of the position and orientation target component. If the obtained likelihood is at or above the threshold value, the processing proceeds to the next step (S390), having determined that the angle of the identifier used in the likelihood computation is close to the actual position and orientation of the component. If the likelihood is below the threshold, the processing returns to step S350, since the actual position and orientation of the component are possibly different from the rough orientation estimation result, then cutting down of the probe window 810 and rough orientation estimation are performed again. When cutting down the probe window 810, the settings are reconfigured, changing the setting of the threshold D0+L0 for determining remote areas in step S350 and the amount of change threshold for the distance value used in step S360. The above processing is repeated using the updated probe window 810 until the identification rate of the identifier having the angles obtained from the rough orientation estimation is at or above the given threshold.

Identifier Priority Level Assignment

In step S390 (identifier priority level assignment step), the angle-differentiated identifiers are rearranged in descending order of priority level, using the rough orientation estimation result obtained in step S370. The processing of step S390 will be described in detail with reference to FIG. 11A.

FIG. 11A shows an example in which priority levels have been assigned to angle-differentiated identifiers, when the rough orientation estimation result obtained in step S370 is a slope θ1 in the vertical rotation direction of 30 degrees and a slope θ2 in the horizontal rotation direction of 30 degrees. The identifier with the highest priority level at this time is the identifier having the angles (θ1=30°, θ2=30°) estimated from the rough orientation estimation result, and priority levels are assigned in ascending order of angle error centered at this angle. In the case where the angle errors are the same at this time, an identifier that deviates in the horizontal rotation direction is prioritized over an identifier that deviates in the vertical rotation direction, such that the priority level of an identifier whose angle error deviates negatively is higher than an identifier whose angle error deviates positively. An example of priority level assignment is shown below:

(*1) 0° (θ1=30°, θ2=30°
(*2) −30° (θ1=30°, θ2=0°
(*3) +30° (θ1=30°, θ2=60°
(*4) −30° (θ1=0°, θ2=30°
(*5) +30° (θ1=60°, θ2=30°

The likelihoods of identifiers for performing detailed estimation of position and orientation are thus computed for the estimated general position and orientation, and the priority order is determined from the likelihoods of the identifiers. The present embodiment thus enables the priority order of identifiers to be determined quickly with a simple configuration.

Position and Orientation Identification

In step S400 (position and orientation identification step), detailed position and orientation identification is performed using the angle-differentiated identifiers rearranged in priority order in step S390. Here, detailed position and orientation identification involves identifying the slope in the vertical rotation direction and the slope in the horizontal rotation direction of the component targeted for position and orientation estimation, using angle-differentiated window sizes provided in the angle-differentiated identifier database. The likelihoods of the identifiers are collated in descending order of priority level to create a likelihood map, and the angles with the highest likelihood are derived from this likelihood map and taken as the detailed position and orientation identification result.

A method of performing detailed position and orientation identification will be described, with reference to FIG. 11B as a specific example. Taking FIG. 11B as a likelihood map collating the likelihood computation result for each angle-differentiated identifier, the identifiers represented by *1 to *9 in FIG. 11B are similar to *1 to *9 in FIG. 11A, and the sequence assigned to the identifiers represents the priority levels assigned in step S390. Also, the average value of the likelihoods of neighboring identifiers (±30° angle error) is used in position and orientation identification. In FIG. 11B, a computation example of the average value of the likelihoods of the identifiers whose angles differs by ±30 degrees is shown. In FIG. 11B, the identifiers within the bold frame are neighboring identifiers relating to the identifier *1 (θ1=30°, θ2=30°, and the identifiers within the dotted frame are neighboring identifiers relating to the identifier *8 (θ1=60°, θ2=60°. If the average value of the likelihoods derived from the group of five identifiers is at or above the threshold value, the identifier whose angles are in the middle of the group of five identifiers is taken as the orientation identification result. If the average value is below the threshold, the average value of likelihoods neighboring the identifier with the next highest priority level is calculated.

The likelihoods are calculated in the priority order assigned in step S390, and the optimum identifier for position and orientation identification is retrieved. The position and orientation estimation result thereby obtained is the final output of the present embodiment.

As described above, in the present embodiment, the general position and orientation of a target component is estimated, the priority order of a plurality of identifiers is determined based on the estimated general position and orientation, and the detailed position and orientation of the target component is estimated using the plurality of identifiers. Position and orientation estimation can thus be performed with high accuracy and efficiency, since detailed position and orientation estimation is performed with identifiers estimated to have a high possibility of matching used in order, rather than using all of the identifiers in sequence. That is, identification accuracy can be maintained while greatly reducing the computational cost in comparison with the case where all of the identifiers are used when performing position and orientation recognition of an object, by performing general estimation of the size and orientation of a component, and selecting an identifier based on the result thereof.

Figure 12:
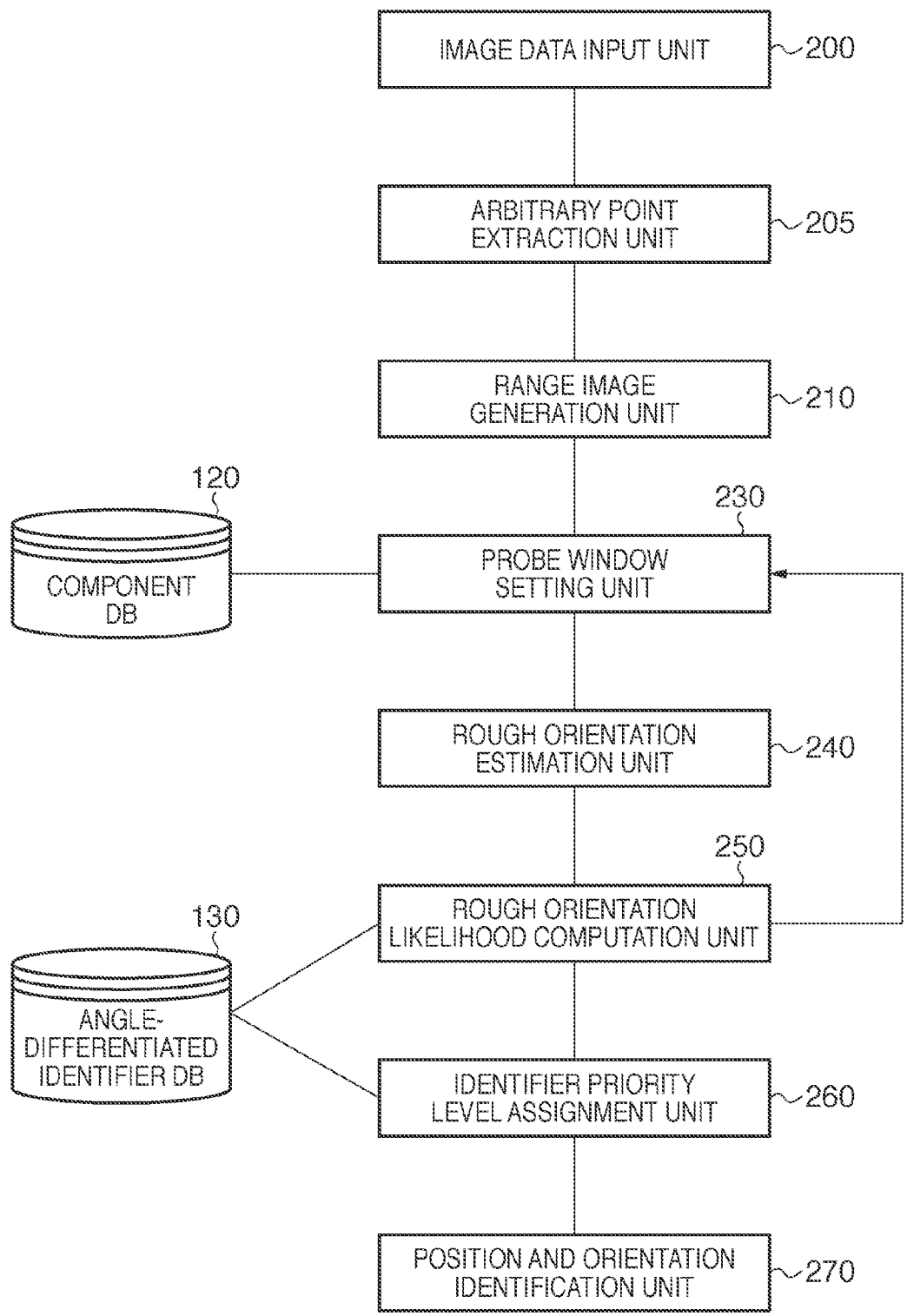
FIG. 12 shows a functional block diagram of an estimation apparatus.

Next, an embodiment will be described in which an arbitrary point extraction unit 205 is added between the image data input unit 200 and the range image generation unit 210 in the functional configuration of FIG. 1 described in Embodiment 1. The functional configuration of the estimation apparatus according to the present embodiment is shown in FIG. 12.

Figure 13:
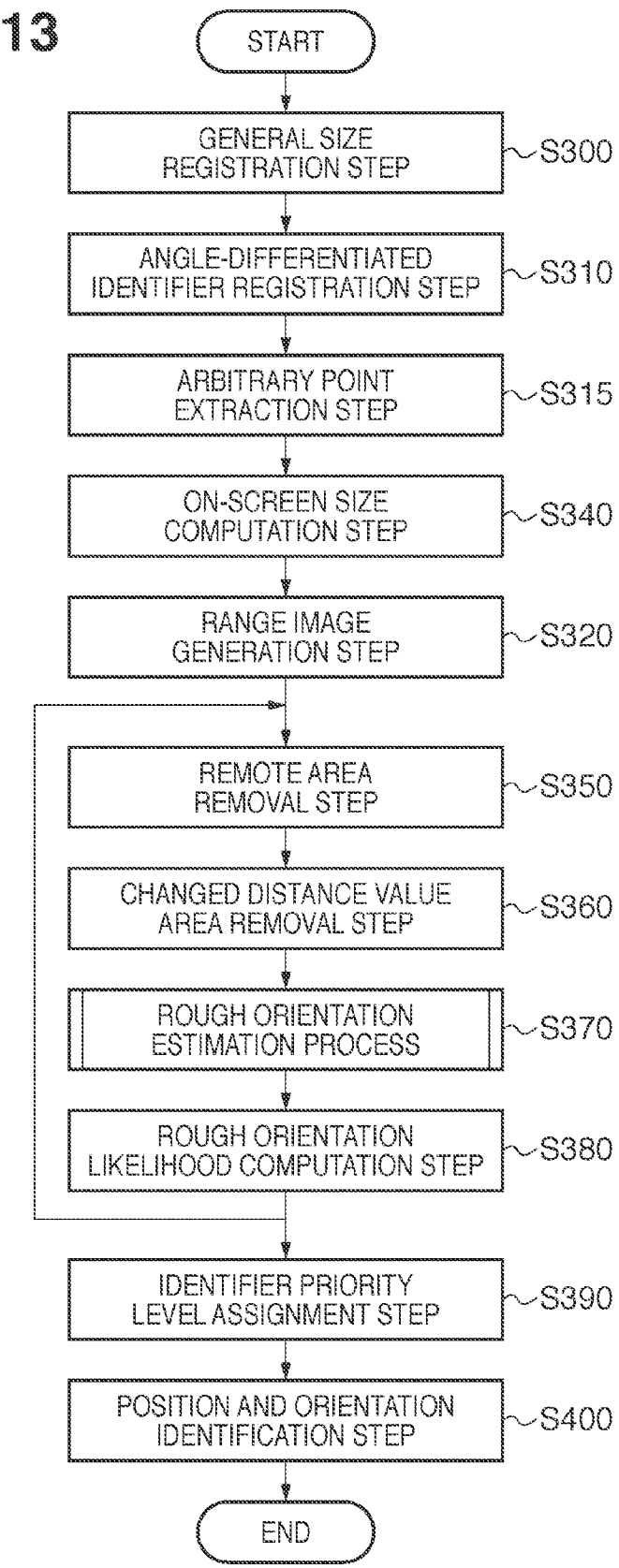
FIG. 13 is a flowchart showing a flow of processing for estimating the position and orientation of a target component.

A flowchart showing the overall processing flow of the present embodiment is shown in FIG. 13. In step 5315 (arbitrary point extraction step) of FIG. 13, a fixed point registered beforehand is taken as the representative point (point A (150) in FIG. 6A). The representative point (point A (150)) is, however, preset so as to be positioned where a component is definitely placed. In the following step S340, the on-screen size L1 is computed from the general size L0 and the distance D0 from the image capturing apparatus to the representative point A (150), similarly to the aforementioned embodiment. Further, in step S320, the representative point (point A (150)) and the on-screen size L1 thus obtained are used to generate a range image with respect to an area clipped to the on-screen size L1 centered at the point A (150).

The present embodiment differs from the aforementioned embodiment in the processing from step S315 to step S320. In the present embodiment, step S315, that was not in the aforementioned embodiment, is newly added, and the processing order of step S320 (range image generation step) and step S340 (on-screen size computation step) is switched. In the aforementioned embodiment, a range image is generated in step S320 with respect to the entire area of the input image, and the probe window 810 is subsequently derived in step S340. In the present embodiment, an arbitrary area is designated before generating the range image, and the range image is generated after specifying the position of an area to be clipped and the probe window. Accordingly, the configuration of the present embodiment enables the computational cost to be further reduced in comparison to the aforementioned embodiment.

Figure 14:
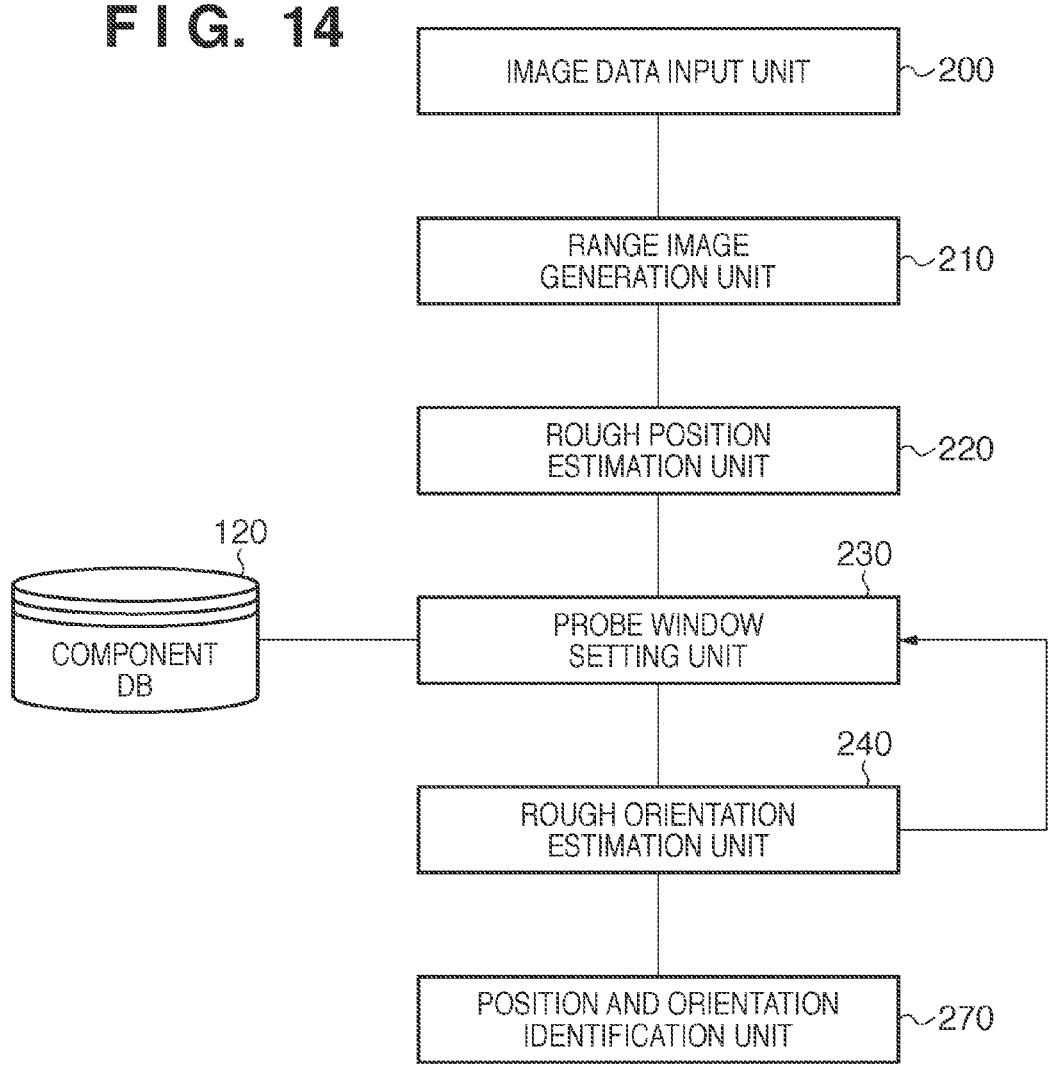
FIG. 14 is a functional block diagram of an estimation apparatus.

Next, an embodiment will be described in which the position and orientation identification unit 270 performs position and orientation identification using the rough orientation estimation result obtained from the rough orientation estimation unit 240, rather than using the rough orientation likelihood computation unit 250 and the identifier priority level assignment unit 260 of the aforementioned embodiment. The functional configuration of the estimation apparatus according to the present embodiment is shown in FIG. 14. The probe window setting unit 230 derives a figure circumscribing the component based on the orientation obtained from the rough orientation estimation unit 240, and sets the window size from the size of the circumscribing figure. The rough orientation estimation unit 240 derives a rough orientation with a similar method to the aforementioned embodiment, using a probe window obtained from the probe window setting unit 230. Here, the n-th rough orientation derived is taken as a rough orientation estimation angle d(n). Also, updating of the rough orientation is determined, based on the rough orientation estimation angle d(n) and a rough orientation estimation angle d(n−1) of the (n−1)th rough orientation estimation result derived. Specifically, the nth rough orientation estimation angle d(n) is compared with the rough orientation estimation angle d(n−1) obtained from the (n−1)th rough orientation estimation result. If |d(n−1)−d(n)| is at or above a given threshold, the processing returns to the window setting unit, having determined that reliability is low, and a rough orientation is derived again.

Figure 15:
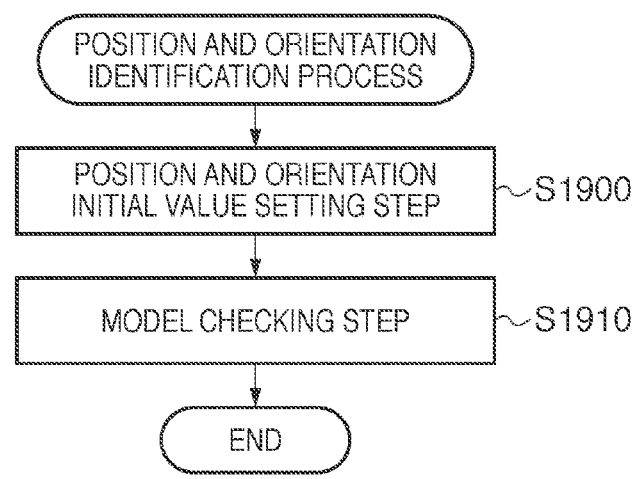
FIG. 15 is a flowchart showing a flow of a position and orientation identification process.

The processing flow (position and orientation identification process) executed by the position and orientation identification unit 270 in the present embodiment is shown in FIG. 15. In step S1900 (position and orientation initial value setting step), the rough position estimation result obtained from the rough position estimation unit 220 and the rough orientation estimation result obtained from the rough orientation estimation unit 240 are set as initial values. In step S1910 (model checking step), model matching with registered components is performed using the initial values set in step S1900. Here, a model fitting technique disclosed in David G. Lowe, "Fitting parameterized three-dimensional models to images," IEEE Transaction on Pattern Analysis and Machine Intelligence, 13(5): 441-450, May 1991 (Hereinafter, Lowe) can be used in the model matching. Recognition of the detailed position and orientation of a component can be performed by using the model fitting technique disclosed by Lowe.

Note that model fitting is a technique that involves fitting a CAD model of the target component to a captured image of the target component. When model fitting is performed in the present invention, the detailed position and orientation of a component fitted to the image can be recognized by performing a search based on the initial values for position and orientation set in step S1900 and using edge information such as the profile of the CAD model.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is, for example, provided to the computer via network or from a recording medium of various types serving as the memory apparatus (e.g., computer-readable medium).

The present invention enables provision of a technique for estimating with high accuracy and speed the position and orientation of objects capable of taking arbitrary positions and orientations in three-dimensional space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291401, filed on Dec. 22, 2009, which is hereby incorporated by reference herein in its entirety.

What is claimed is:

1. An apparatus comprising:
a capturing unit configured to capture a target object; and
a processor, the processor being programmed to function as:
(1) a range image generation unit configured to generate a range image representing distance information from the capturing unit to the target object;
(2) a general estimation unit configured to analyze the range image and estimate a general position and orientation of the target object;
(3) a determination unit configured to determine a priority order of a plurality of identification units, each of which estimates a detailed position and orientation of the target object within a predetermined position and orientation range, based on the general position and orientation estimated by the general estimation unit;
(4) a setting unit configured to set a search window indicating a range for detailed estimation of position and orientation of the range image based on a preregistered general size of the target object;
(5) a calculation unit configured to calculate a difference between a first distance value of a first pixel in the range image and a second distance value of a second pixel which is next to the first pixel in the range image;
(6) an updating unit configured to update the search window based on the calculated difference; and
(7) a detailed estimation unit configured to estimate a detailed position and orientation of the target object, using the plurality of identification units in the priority order determined by the determination unit within the range of the search window.

2. The estimation apparatus according to claim 1, wherein the general estimation unit includes:
a general position estimation unit configured to estimate a general position of the target object from the distance information represented by the range image; and
a general orientation estimation unit configured to estimate a general orientation of the target object, using a positional relationship of two points on the target object shown by the range image and an average value of normal vectors on a surface of the target object.

3. The estimation apparatus according to claim 2, wherein the general orientation estimation unit estimates an orientation of the target object relating to a first rotation direction from the positional relationship of two points, and an orientation of the target object relating to a second rotation direction orthogonal to the first rotation direction from the average value of normal vectors.

4. The estimation apparatus according to claim 1, wherein the determination unit computes a degree of reliability of each of the identification units that estimate detailed position and orientation, for the general position and orientation estimated by the general estimation unit, and determines the priority order from the computed degrees of reliability.

5. The estimation apparatus according to claim 1, wherein the preregistered general size of the target object is indicated by a distance between two predetermined points on a prescribed three-dimensional shape including the target object.

6. The estimation apparatus according to claim 1, wherein the plurality of identification units are provided at different angles in three-dimensional space corresponding to the orientation of the target object.

7. A control method of, comprising:
a capturing step of capturing a target object using a capturing unit and generating a range image representing distance information from the capturing unit to the target object;
a general estimation step of analyzing the range image and estimating a general position and orientation of the target object;
a determination step of determining a priority order of a plurality of identification units, each of which estimates a detailed position and orientation of the target object within a predetermined position and orientation range, based on the general position and orientation estimated in the general estimation step;
a setting step of setting a search window indicating a range for detailed estimation of position and orientation on the range image based on a preregistered general size of the target object;
a calculation step of calculating a difference between a first distance value of a first pixel in the range image and a second distance value of a second pixel which is next to the first pixel in the range image;

an updating step of updating the search window based on the calculated difference; and a detailed estimation step of estimating a detailed position and orientation of the target object, using the plurality of identification units in the priority order determined in the determination step within the range of the search window.

8. A non-transitory computer-readable medium storing a program for causing a computer to function as the units of the estimation apparatus according to claim 1.

* * * * *